(12) United States Patent
Wang

(10) Patent No.: US 7,717,820 B2
(45) Date of Patent: May 18, 2010

(54) PLANET GEAR SPEED REDUCER

(76) Inventor: Sheng Bor Wang, 25, Alley 1, Lane 2, Manping 2nd Street, Banciao, Taipei (TW)

( * ) Notice: Subject to any disclaimer, the term of this patent is extended or adjusted under 35 U.S.C. 154(b) by 450 days.

(21) Appl. No.: 11/853,842

(22) Filed: Sep. 12, 2007

(65) Prior Publication Data
US 2009/0069145 A1    Mar. 12, 2009

(51) Int. Cl.
*F16H 57/08* (2006.01)
(52) U.S. Cl. ...................................................... 475/331
(58) Field of Classification Search ................. 475/149, 475/150, 331, 348
See application file for complete search history.

(56) References Cited
U.S. PATENT DOCUMENTS

| | | | | |
|---|---|---|---|---|
| 3,958,465 A | * | 5/1976 | Hiersig et al. ................... 475/1 |
| 4,158,967 A | * | 6/1979 | Vatterott ....................... 74/410 |
| 6,129,648 A | * | 10/2000 | Tanioka et al. ............... 475/331 |
| 6,824,495 B1 | * | 11/2004 | Kirschner .................... 475/348 |
| 6,857,984 B2 | * | 2/2005 | Imanishi et al. ............. 475/331 |
| 7,121,974 B2 | * | 10/2006 | Bayer et al. ................. 475/331 |
| 2004/0235609 A1 | * | 11/2004 | Chang ........................ 475/331 |

* cited by examiner

*Primary Examiner*—Ha D. Ho

(57) ABSTRACT

A planet gear speed reducer includes a casing having a receiving space defined therein for receiving an output shaft and an input shaft. The output shaft and the input shaft are longitudinally connected to each other. The output shaft includes a planet gear arm and a drive axle concentrically and longitudinally extending the planet gear arm. A third bearing is mounted in a bottom of the planet gear arm. The input shaft has a sun gear axle concentrically extends therefrom and engaged to the multiple planet gears on the planet gear arm. A fourth bearing is securely sleeved on a heel of the sun gear axle and an outer periphery of the fourth bearing is securely received within annular protrusion. A stub concentrically and longitudinally extends from a free end of the sun gear axle and securely received in the third bearing.

2 Claims, 2 Drawing Sheets

PLANET GEAR SPEED REDUCER

BACKGROUND OF THE INVENTION

1. Field of the Invention

The present invention relates to a speed reducer, and more particularly to a planet gear speed reducer.

2. Description of Related Art

In the mechanism field, a speed reducer is usually used to provide low RPM and high torsion for operating a high load apparatus. The conventional speed reducers are divided into two types, such as gear box speed reducers and planet gear speed reducers. The gear box speed reducer does not concern about the scope of the present invention. Hereinafter, only the planet gear speed reducer is described.

A conventional planet gear speed reducer uses two bearing to support an output shaft in a casing of the speed reducer. A bearing is mounted in a gear arm of the output shaft for supporting the input shaft. A sun gear axle extends from the input shaft for driving a planet gear set that is disposed on the gear arm of the output shaft to output power via the output shaft.

The conventional planet gear speed reducer only provides a bearing between the output shaft and the input shaft for concentrically connecting the output shaft and the input shaft, and the planet gar set is driven by a free end of the sun gear axle. Consequently, the concentricity between the input shaft and the output shaft may be reduced because the error during assembling the two shafts and the not precise manufacturing of the input shaft. In addition, operating sun gear axle will enlarge the error between the output shaft and the input shaft such that the sun gear axle the planet gear set is easily worn out and the use life is shortened.

The present invention has arisen to mitigate and/or obviate the disadvantages of the conventional planet gear speed reducer.

SUMMARY OF THE INVENTION

The main objective of the present invention is to provide an improved planet gear speed reducer that has a good concentricity and a long use life.

To achieve the objective, the speed reducer in accordance with the present invention comprises a casing having a receiving space defined therein for receiving an output shaft and an input shaft. A first annular groove and a second annular groove are respectively defined in a front end and middle section in the casing. A first bearing and a second bearing are respectively and securely received in the first annular groove and the second annular groove. The output shaft and the input shaft are longitudinally connected to each other. The output shaft includes a planet gear arm and a drive axle concentrically and longitudinally extending the planet gear arm. The drive axle extends through the front end of the casing for driving an apparatus that needs a high torsion. The first bearing and the second bearing are respectively and securely sleeved on the drive axle and the planet gear arm. The planet gear arm is cylindrical and has multiple planet gears rotatably mounted thereon by pivots. Each plant gear is engaged to a gear ring that is formed on an inner periphery of the casing. The planet gear arm has a bottom corresponding to the drive axle and a cavity defined in the bottom for securely received a third bearing. An annular protrusion inward extends from an inner periphery of the planet gear arm. The input shaft has a sun gear axle concentrically extends therefrom and engaged to the multiple planet gears on the planet gear arm. A fourth bearing is securely sleeved on a heel of the sun gear axle and an outer periphery of the fourth bearing is securely received within annular protrusion. A stub concentrically and longitudinally extends from a free end of the sun gear axle and securely received in the third bearing.

Further benefits and advantages of the present invention will become apparent after a careful reading of the detailed description with appropriate reference to the accompanying drawings.

DETAILED DESCRIPTION OF THE INVENTION

Figure 1:
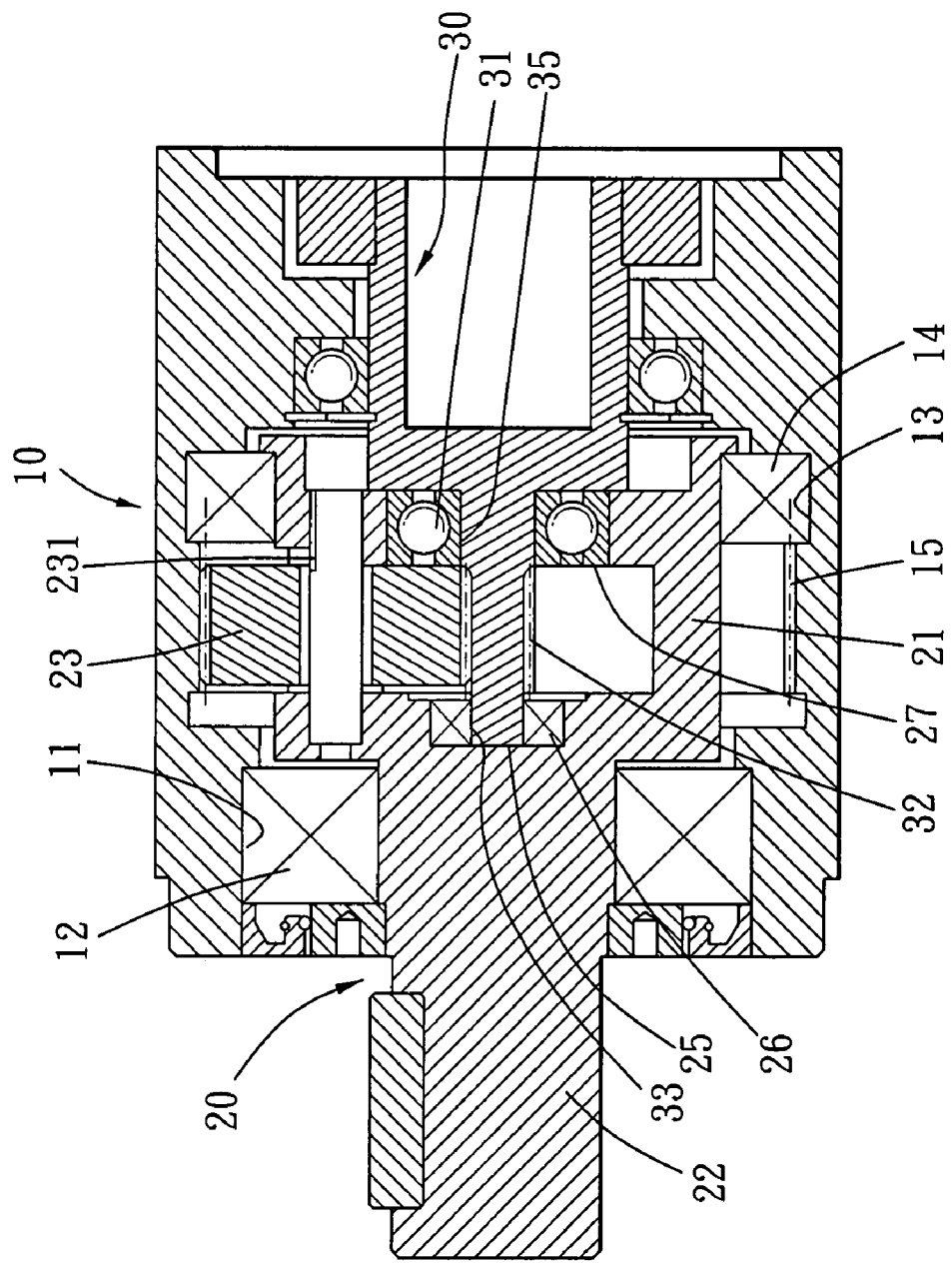
FIG. 1 is a cross-sectional view of a planet gear speed reducer in accordance with the present invention.
Figure 2:
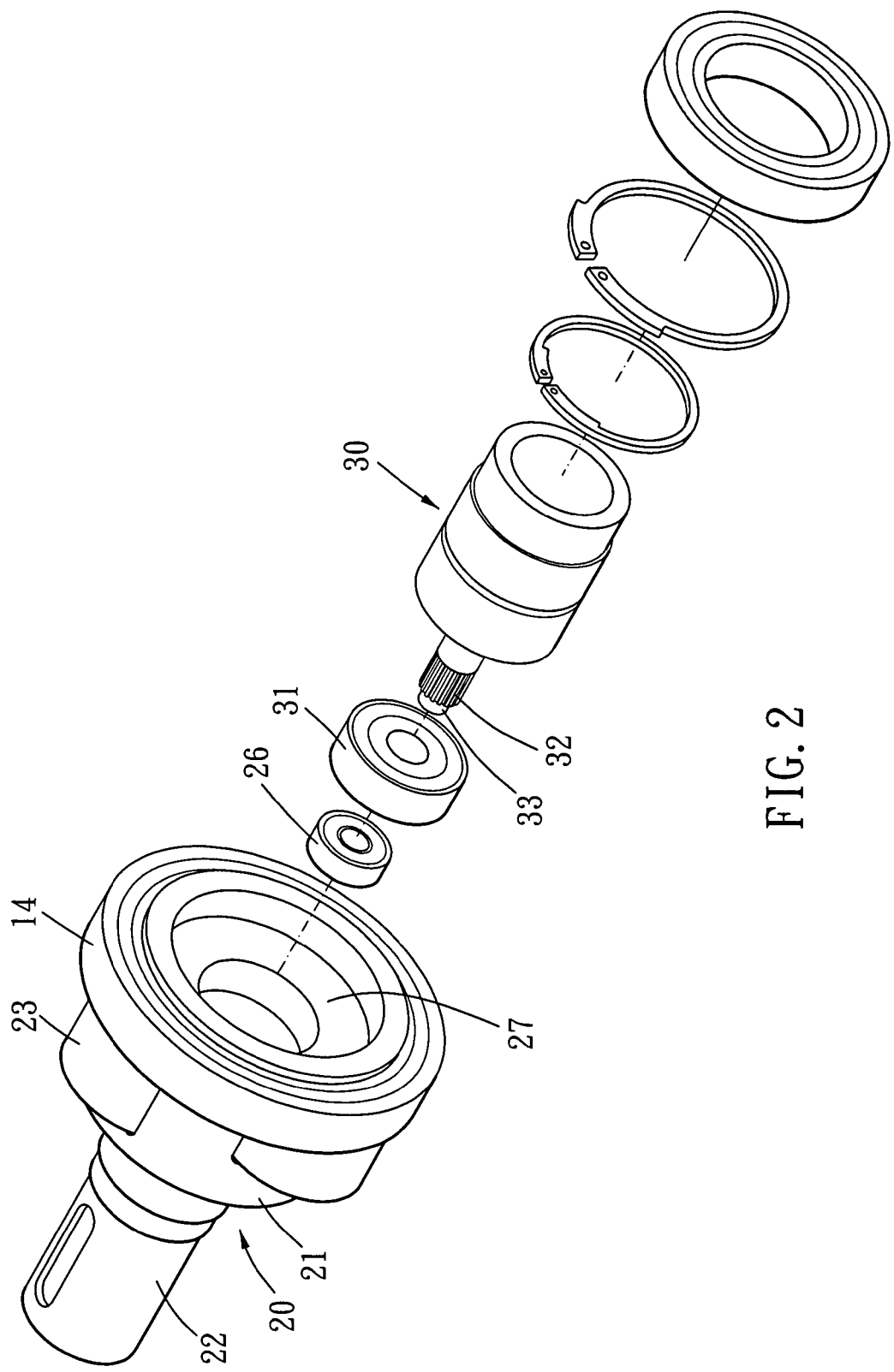
FIG. 2 is an exploded perspective view of the planet gear speed reducer in accordance with the present invention.

Referring to the drawings and initially to FIGS. 1 and 2, a planet gear speed reducer in accordance with the present invention comprises casing (10), an output shaft (20) and an input shaft (30) respectively and rotatably received in the casing (10), wherein the output shaft (20) and the input shaft (30) are longitudinally connected to each other.

The casing (10) has a receiving space defined therein for receiving the output shaft (20) and the input shaft (30). A first annular groove (11) and a second annular groove (13) are respectively defined in a front end and middle section in the casing (10). A first bearing (12) and a second bearing (14) are respectively and securely received in the first annular groove (11) and the second annular groove (13).

The output shaft (20) includes a planet gear arm (21) and a drive axle (22) concentrically and longitudinally extending the planet gear arm (21). The drive axle (22) extends through the front end of the casing (10) for driving an apparatus that needs a high torsion. The first bearing (12) and the second bearing (14) are respectively and securely sleeved on the drive axle (22) and the planet gear arm (21). The planet gear arm (21) is cylindrical and has multiple planet gears (23) rotatably mounted thereon by pivots (not numbered). Each plant gear (23) engaged to a gear ring (15) that is formed on an inner periphery of the casing (10). Each pivot has a slit (231) longitudinally defined in an outer periphery of the pivot. The slit (231) extends into the plant gear (23) for user to pour lubricant into the planet gear (23). The planet gear arm (21) has a bottom corresponding to the drive axle (22) and a cavity (25) is defined in the bottom for securely received a third bearing (26). An annular protrusion (27) inward extends from an inner periphery of the planet gear arm (21).

The input shaft (30) has a sun gear axle (32) concentrically extending therefrom and engaged to the multiple planet gears (23) on the planet gear arm (21). A fourth bearing (31) is securely sleeved on a heel of the sun gear axle (32) and an outer periphery of the fourth bearing (31) is securely received within annular protrusion (27). A stub (33) concentrically and longitudinally extends from a free end of the sun gear axle (32) and securely received in the third bearing (26).

As described above, the first bearing (12) and the second bearing (14) are provided to longitudinally position the output shaft (20), and the third baring (26) and the fourth bearing (31) are provided to longitudinally position the input shaft (30). As well known, the concentricity of one piece is easily controlled during processing. In addition, the first bearing (12) and the second bearing (14) are respectively mounted in the casing (10). Consequently, the concentricity between the casing (10) and the output shaft (20) is precise. Furthermore, the third bearing (26) and the fourth bearing (31) are respectively mounted in the output shaft (20). As a result, the concentricity between the output shaft (20) and the input shaft (30) is precise after assembled. In another word, the concentricity among the casing (10), the output shaft (20) and the input shaft (30) is precise after assembled without adjusting. Under this condition, the input shaft (30) can stably drive the planet gear set and the output shaft (20) such that the use life of the planet gear speed reducer is lengthened.

In addition, the inner rings of the third bearing (26) and the fourth bearing (31) are rotated with the input shaft (30), and the outer rings of the third bearing (26) and the fourth bearing (31) are rotated with the output shaft (20). As well known, a ratio exists between the input shaft and the output shaft of a speed reducer. For example, the ratio is ten in the present invention, the outer rings of the third bearing (26) and the fourth bearing (31) rotate one ring when the inner rings of the third bearing (26) and the fourth bearing (31) rotate ten rings along the same direction. Consequently, the comparative rings between the inner rings of the third bearing (26) and the fourth bearing (31) is nine. The comparative rings between the inner rings of the third bearing (26) and the fourth bearing (31) are reduced when the ratio of the speed reducer of the present invention is lowered. As a result, the use life of the third bearing (26) and the fourth bearing (31) is lengthened, that is, the use life of the speed reducer is lengthened, too.

Although the invention has been explained in relation to its preferred embodiment, it is to be understood that many other possible modifications and variations can be made without departing from the spirit and scope of the invention as hereinafter claimed.

What is claimed is:

1. A planet gear speed reducer comprising:

a casing having a receiving space defined therein for receiving an output shaft and an input shaft, a first annular groove and a second annular groove respectively defined in a front end and middle section in the casing, a first bearing and a second bearing respectively and securely received in the first annular groove and the second annular groove, wherein the output shaft and the input shaft are longitudinally connected to each other;

the output shaft including a planet gear arm and a drive axle concentrically and longitudinally extending the planet gear arm, the drive axle extending through the front end of the casing for driving an apparatus that needs a high torsion, the first bearing and the second bearing respectively and securely sleeved on the drive axle and the planet gear arm, the planet gear arm being cylindrical and having multiple planet gears rotatably mounted thereon by pivots, each plant gear engaged to a gear ring that is formed on an inner periphery of the casing, the planet gear arm having a bottom corresponding to the drive axle and a cavity defined in the bottom for securely received a third bearing, an annular protrusion inward extending from an inner periphery of the planet gear arm; and the input shaft having a sun gear axle concentrically extending therefrom and engaged to the multiple planet gears on the planet gear arm, a fourth bearing securely sleeved on a heel of the sun gear axle and an outer periphery of the fourth bearing securely received within annular protrusion, a stub concentrically and longitudinally extending from a free end of the sun gear axle and securely received in the third bearing.

2. The planet gear speed reducer as claimed in claim 1, wherein each pivot has a slit longitudinally defined in an outer periphery of the pivot and the slit extends into the plant gear for user to pour lubricant into the planet gear.

* * * * *